United States Patent [19]

Dzuban

[11] 4,281,927

[45] Aug. 4, 1981

[54] APPARATUS FOR INDICATING MAXIMUM RESOLUTION FOR PROJECTED IMAGES

[76] Inventor: Louis Dzuban, 384 Jeffries St., Perth Amboy, N.J. 08861

[21] Appl. No.: 69,627

[22] Filed: Aug. 27, 1979

[51] Int. Cl.³ .............................................. G03B 27/34
[52] U.S. Cl. .................................... 356/124; 250/233; 250/234; 355/56
[58] Field of Search ................................ 356/124–126; 250/201, 233, 234; 354/25; 350/46; 352/140; 355/56, 55

[56] References Cited

U.S. PATENT DOCUMENTS

| 3,549,889 | 12/1970 | Akiyama | 250/234 |
| 3,555,280 | 1/1971 | Richards, Jr. | 250/234 |
| 3,776,639 | 12/1973 | Stauffer | 356/125 |
| 3,906,219 | 9/1975 | Stauffer | 356/125 |
| 3,967,110 | 6/1976 | Rogers et al. | 250/234 |

Primary Examiner—John K. Corbin
Assistant Examiner—Bruce Y. Arnold
Attorney, Agent, or Firm—Arthur L. Plevy

[57] ABSTRACT

There is disclosed a maximum resolution indicator for photographic apparatus. The indicator utilizes a photocell which is scanned by a rotating disc having an aperture located on a surface thereof and communicating with the surface of the photocell. The output of the photocell is monitored to determine a maximum amplitude for high frequency components indicative of the content of the projected image. When the high frequency components as propagated through a high pass filter are of maximum amplitude, the system is at an optimum focusing point indicating to the operator that the image may be impressed upon a suitable film or that a picture can be taken in the case of a camera.

7 Claims, 4 Drawing Figures

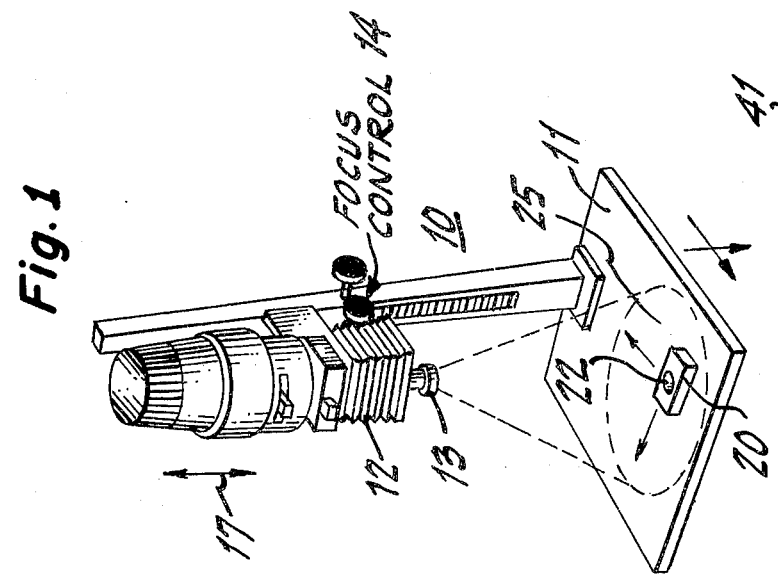
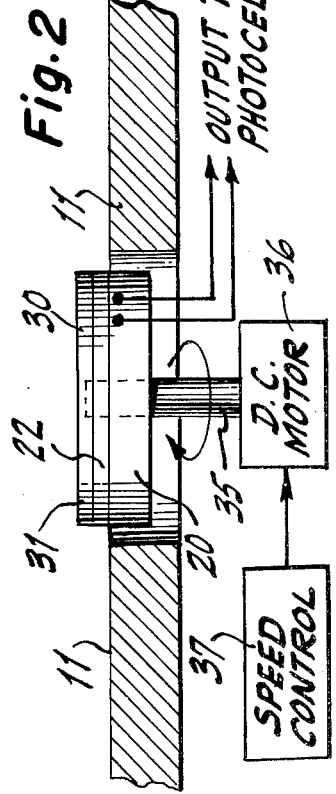
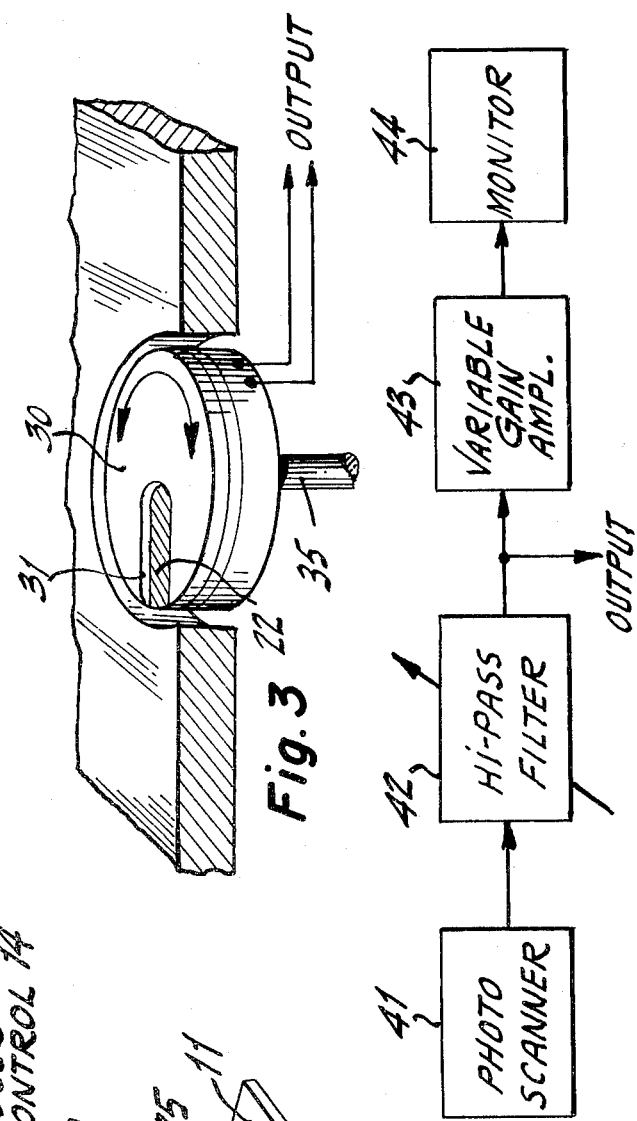
Fig.2
Fig.3
Fig.1
Fig.4

APPARATUS FOR INDICATING MAXIMUM RESOLUTION FOR PROJECTED IMAGES

BACKGROUND OF THE INVENTION

This invention relates to a focusing technique or apparatus for determining the maximum resolution for projected images.

The prior art is replete with a number of patents which describe automatic focusing equipment for various photographic aids. Many of the systems described in the prior art are quite complex and involve various techniques and methods to implement or aid in obtaining maximum resolution for a photographic enlarger, a projector or a camera. Many such systems employ mechanical techniques, while various other systems use optical methods and techniques. Examples of certain prior art techniques can be found when referring to the following patents:

U.S. Pat. No. 3,249,007 entitled AUTOMATIC FOCUSING PHOTOGRAPHIC PROJECTOR issued on May 3, 1966 to N. L. Stauffer describes an optical sensing arrangement which focuses a pattern of light at the plane of a slide which is to be projected. A reflected portion of the pattern is then focused on a pair of photocells which are responsive to the position of the image. One varies the focusing of the projector until the output from the photocells is equal, which null condition corresponds to a proper focus.

U.S. Pat. No. 3,678,835 entitled AUTOMATIC FOCUSING DEVICE FOR CAMERAS AND THE LIKE issued on July 25, 1972 to Takishima describes an automatic focusing device which employs a chopper positioned in front of a mirror. The chopper directs two different light beams on a common photoelectric element. One obtains two different AC signals which are applied to an amplifier which controls a servo motor operative to focus the camera.

Other patents as U.S. Pat. No. 3,735,686 and U.S. Pat. No. 3,930,261 show automatic focusing schemes which also employ optical aids such as photocells to aid in focusing. The difficulty with such systems is that they are relatively complicated in that they require special components, special types of filters and in general, are fairly difficult to implement and relatively expensive to fabricate.

Focusing which is done in a photographic studio or laboratory is usually dependent upon the visual acuity of the operator and hence, depending upon his skill and familiarity with the mechanics of the particular focusing systems, the selection of resolution is usually determined by the individual and is completely dependent upon his ability. This, of course, presents a problem in that it limits the operation of such devices to skilled personnel.

It is an object of the present invention to determine the point of maximum projected resolution by employing a simple apparatus which serves to provide a signal when maximum projected resolution is obtained. The furnishing of this signal completely obviates the problems associated with normal focusing and hence, enables personnel who are not skilled to perform enlargement or other operations in the photographic laboratory.

While the invention is directed to be used with an enlarger, it has applicability for use in providing maximum resolution for other devices such as cameras, projectors and so on.

BRIEF DESCRIPTION OF THE PREFERRED EMBODIMENT

Apparatus for providing an indication of maximum resolution indicative of an optimum focusing position for a photographic apparatus of the type operative to respond to an image located at a given plane from said photographic apparatus, comprising a photocell located at said plane and positioned to intercept a portion of said image, an opaque disc having a slot therein and positioned to cover said photocell to expose a predetermined portion of the surface of said cell to said image, means coupled to said disc for rotating the same and means coupled to the output of said photocell and responsive solely to high frequency components emanating therefrom during rotation of said disc to provide a signal indicative of the amplitude of said components whereby a maximum amplitude indicates maximum resolution.

BRIEF DESCRIPTION OF THE FIGURES

FIG. 1 is a diagrammatic view of photographic apparatus used on conjunction with the present invention.

FIG. 2 is a side cross sectional view of a resolution indicator according to this invention.

FIG. 3 is a perspective view of the indicator shown in FIG. 2.

FIG. 4 is an electrical schematic block diagram of a maximum resolution indicator.

DETAILED DESCRIPTION OF THE INVENTION

Referring to FIG. 1, there is shown a schematic diagram of a photographic enlarger 10 of the type which may be employed in a film processing laboratory or for home use. The enlarger 10 contains a flat plane surface 11 which is referred to as an enlarger easel. The easel 11 is positioned below an enlargement head 12. The head 12 contains an optical system including a lens 13 which is controlled with respect to the easel by means of a focus control 14. The enlarger head 12 contains a bellows for varying the depth and the size of the image as projected on the easel 11. The head 12 may be moved away or towards the easel in the directions shown by arrow 17 to accommodate various picture sizes and so on. The operation of such enlargers and the various equipment available are well known in the state of the art and the technique to be described will operate in conjunction with any of these devices.

Shown positioned on the easel is a housing 20. The housing 20 contains a photosensitive element 22 such as a typical photocell. The photocell 22 communicates with an aperture in a plate. The plate is caused to rotate by means of a motor. The rotation of the plate produces a signal which is a function of the resolution of the image 25 which is projected on the easel 11 by the optical system in the enlarger head 12.

Basically, the observed output of the photocell, as will be described, is a steady state, integrated value of all varied light intensities from the image which impinge upon the photocell. This information is very useful in determining exposure and negative density.

Referring to FIG. 2, there is shown a cross section of the photocell apparatus and housing 20. Preferably, the plane of the surface of the photocell should be aligned with the plane of the easel to obtain proper maximum resolution. In any event, the photocell can be positioned in a thin housing and extend from the surface of the easel plane 11. The photocell 22 is positioned in housing 20 in a relatively fixed position.

Positioned above the photocell 22 is a rotatable opaque disc 30 having a slot 31 located in a surface thereof. The disc 30 is coupled to a shaft 35 which is rotated by means of a DC motor 36. The speed of rotation in regard to the DC motor can be approximately 1,000 to 3,000 rpm. The motor may have a speed control 37 associated therewith to enable variation of the motor speed as desired. Speed control of such motors is well known and there are many techniques for providing such control.

Referring to FIG. 3, there is shown a perspective view of the opaque disc 30 of the aperture 31 and the exposed surface of the photocell 22 within the aperture. Essentially, the scanned photocell area is placed in the plane of the projected image. As the photocell is scanned by the aperture 31 rotating, it provides an output which will vary as a function of the instantaneous light value that is exposed by the moving aperture.

As seen in FIG. 1, if the photocell is contained in a separate housing 20, it may be moved at any position within the plane of the projected image 25. In any event, the photocell as shown in FIG. 2 may be permanently affixed to the easel and located at one position where the operator when projecting an image on the plane 11, would be assured that a portion of the image impinges upon the photocell.

The operator, upon performing a coarse setting for the enlarger which is indicative of the size of the print to be provided, slowly moves the focus control 14 associated with the enlarger. As the focus is improved, the difference in scanned areas which impinge upon the photocell will increase. This is noted as an increase in the high frequency components of the projected image. When one obtains a maximum high frequency output from the system, this is indicative of maximum resolution or the point of best focus.

Referring to FIG. 4, a schematic diagram of the electrical circuit used in conjunction with this invention is shown. The output leads of the scanned photocell, indicated in FIG. 4 as photo scanner 41, is coupled to the input of a high pass filter 42. The proper band pass of the filter 42 is determined by the rotational speed of the motor as well as image content and the effective width and length of the aperture slit 31 in the opaque rotating disc 30. For example, for rotational speeds of 1,000 rpm with an aperture of about $\frac{3}{4}$" long and $\frac{1}{4}$" wide, high frequency components are about 1,000 cycles for normal type images. It is, of course, understood that the frequencies provided by this system may vary depending upon motor speed and so on as above indicated, but all such frequencies can be accommodated by optimizing and adjusting the high pass filter. In this manner, the high pass filter has a bandwidth which is predetermined. The bandwidth can be made variable by many techniques known in the electronic art and within limits determined by the rotational speed control associated with the DC motor 36. The high pass filter serves to propagate only those high frequency components which emanate from the photocell.

The output from the high pass filter 42 is coupled to an input of a variable gain amplifier which also may include a suitable detector circuit such as a peak detector to thereby convert the high frequency signal amplitudes into a DC signal. The amplifier 43 has a variable gain control to enable an operator to adjust the same for a convenient output.

The output of the amplifier 43 is coupled to the input of a suitable monitor circuit such as a meter and so on. It is noted that one could directly monitor the output of the high pass filter 42 by means of an oscilloscope or other device and obtain at the output of the high pass filter an indication of the magnitude of the high frequency signal. This would enable an operator to achieve a visual indication directly from the high pass filter which is indicative of the maximum resolution.

It is, of course, obvious from the above description that the signal provided by the circuitry in FIG. 4 increases in amplitude as the maximum resolution is approached. In this manner, the output signal could be used to control a servo system which employs a motor to automatically control the focusing of the enlarger and hence, the focus can be automatically set according to the magnitude of the high frequency signal.

In the above described system, the distance from the projector or enlarger head to the viewing plane 11 is not a function of the particular system and hence, smaller f stops give greater sensitivity, but the high frequency signal from the photocell still falls within the band pass of the filter 42.

In summation, the above described system employs a scanning disc having an aperture, which device is rotated with respect to a surface of a photocell. The photocell responds to the content of the projected image to produce a high frequency signal. This signal increases as focusing is controlled to provide a maximum output for the optimum focusing level. This output is then used to indicate that maximum resolution has been achieved to enable the operator to reliably control and adjust the photographic equipment according to the output. The system completely eliminates the need for relying solely on the operator's skill. These and other aspects of the present invention will become apparent to those skilled in the art upon reading of the above specification and many alternatives may be discerned and are deemed to be encompassed within the spirit and scope of the claims appended hereto.

While the above described the photocell and the disc as separate units, it is understood that the photocell may be bonded directly to the disc and the entire assembly rotated. In this manner, one could couple the output from the photocell through brushes or other rotational coupling devices known in the art.

I claim:

1. Apparatus for providing an indication of maximum resolution indicative of an optimum focusing position for a photographic apparatus of the type operative to respond to an image located at a given plane from said photographic apparatus, comprising:
   (a) a single photocell located at said plane and positioned to intercept a portion of said image,
   (b) an opaque disc having a single radial slot therein with said slot being substantially smaller in area than half the area of said disc, and positioned in contact with said photocell to expose a predetermined portion of the surface of said cell to said image,
   (c) means coupled to said disc for rotating the same,
   (d) means coupled to the output of said photocell and responsive solely to high frequency components emanating therefrom during rotation of said disc, to provide a signal indicative of the amplitude of said components whereby a maximum amplitude indicates maximum resolution.

2. The apparatus according to claim 1 wherein said means coupled to said disc for rotating the same comprises a DC motor.

3. The apparatus according to claim 1 wherein said means coupled to the output of said photocell includes a high pass filter having a band width determined by the speed of rotation and the image content.

4. The apparatus according to claim 3 further including a variable gain amplifier coupled to the output of said high pass filter for providing an amplified version of said high frequency components and monitor means coupled to the output of said amplifier for providing an indication of said amplitude to a user.

5. The apparatus according to claim 1 wherein said photocell is movable within said plane.

6. The apparatus according to claim 2 wherein the speed of said motor is in excess of 1,000 rpm.

7. The apparatus according to claim 1 wherein said photographic apparatus is a photographic enlarger.

* * * * *